United States Patent Office 2,726,230
Patented Dec. 6, 1955

2,726,230

PREPARATION OF PLASTIC CONDENSABLE ALKYL ACRYLATE POLYMERS AND SUBSEQUENT ELASTO-CONDENSATION THEREOF

Earl J. Carlson, Akron, Ohio, assignor to The B. F. Goodrich Company, New York, N. Y., a corporation of New York No Drawing. Application November 24, 1950,
Serial No. 197,524

15 Claims. (Cl. 260—86.1)

The present invention relates generally to synthetic polymeric materials and to a method of making same. The invention relates more specifically to plastic acrylic interpolymers which are formed by polymerization of a monomeric mixture containing at least two essential ingredients, one an acrylic ester and the other an olefinically-unsaturated carboxylic acid, and are further characterized by the ability to undergo useful condensation reactions by reason of the presence in their structure of a controlled amount of free carboxyl (—COOH) groups, and to the subsequent elasticization (or curing) of such plastic acrylic interpolymers by a condensation reaction (termed herein "elasto-condensation") involving the free carboxyl groups.

Polymeric alkyl acrylates and copolymers of alkyl acrylates with minor proportions of other copolymerizable monomers such as chloroethyl vinyl ether, acrylonitrile, acrylamide and others, form a very useful class of plastic rubbery materials having unusual properties such as resistance to light, heat, ozone, oils, fats, etc. As disclosed in U. S. Patents Nos. 2,411,899, 2,412,475, 2,412,476, 2,451,177 and 2,451,178, to Stephen T. Semegen such plastic polymers may be "cured" or converted to an essentially elastic condition by heating mixtures of the resin with, respectively, alkali-metal silicates, alkali-metal stannates, alkali-metal vanadates, litharge, and alkali-metal hydroxides. The compositions thus formed are more elastic in nature and form more useful sheet and film materials and coating, dipping, and impregnating compositions than the uncured polymers. The latter compositions are, however, subject to certain disadvantages including limited tensile strength (seldom above 600 to 800 lbs./sq. in.) and poor balance of the physical properties requisite to produce the "snappiness" desired in elastic rubbery materials. In addition "curing" by such methods requires excessively long curing cycles at high temperatures.

I have now discovered, however, that alkyl esters of acrylic acid interpolymerize with olefinically-unsaturated carboxylic acids as hereinafter described, to produce new polymeric materials which are plastic and easily worked in the raw or uncured condition and which possess, in the cured, vulcanized or elasticized condition, tensile strengths of several thousand lbs./sq. in. without reinforcement, unusual resistance to ozone, water, sunlight, acids, bases and other powerful deleterious influences, and a much better balance of the physical properties requisite to produce "snappy" cured or elasticized materials than do the known alkyl acrylate polymers when cured in the known ways. This great improvement in physical properties is obtained by subjecting them to what I have termed an "elasto-condensation" involving their elasticization or "curing" by reason of a condensation reaction involving (1) the free carboxyl groups in their structure and (2) an added agent, such as a polyvalent metal oxide, particularly zinc oxide, which is reactive with the carboxyl groups. In other words they may be thought of as polymeric metallo-carboxylates possessing a three-dimensional cross-linked structure in which linear acrylic polymer molecules are connected to each other by a plurality of primary valence units of the structure

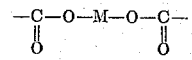

M being a polyvalent metallic atom, to form larger polymeric molecules.

The production of these elastic polymeric compositions, in accordance with my invention, is effected by a multi-step process as follows:

A. Preparing a plastic alkyl acrylate interpolymer containing a controlled amount of combined free carboxyl groups, B. Admixing the plastic workable polymer with a polyvalent metal oxide, and C. Heating the resulting plastic composition until the salt-forming polymeric condensation reaction has occurred and the mixture has been converted from an essentially plastic condition to an essentially strong, elastic, non-plastic condition.

Step A in the process may be carried out in several ways all designed to produce a plastic workable acrylic polymer which contains a controllable quantity of combined carboxyl groups. One method, particularly described in the present application, involves the polymerization in an acidic aqueous medium of a monomeric mixture containing an alkyl acrylate and a controlled amount of an olefinically-unsaturated carboxylic acid. This method is of especial importance to those who operate their own polymerization facilities and has the advantage of providing maximum flexibility, by proper choice of polymerization materials and conditions, in the nature and characteristics of the carboxyl-containing polymer used in Steps B and C.

Another method of operation in Step A of the process, of importance to those who have no polymerization facilities, involves the reaction with a hydrolysis agent of a plastic alkyl acrylate polymer thereby to hydrolyze a portion of the hydrolyzable ester groups and produce a plastic polymeric material containing combined carboxyl (—COOH) groups. This alternative method is described in greater detail in the copending application of Harold P. Brown, Serial No. 197,496, filed November 24, 1950.

In the production of the polymers in Step A according to the present invention a monomeric mixture is polymerized in acidic aqueous medium comprising, as essential ingredients, at least 50% by weight of an alkyl acrylate such as ethyl acrylate and equal or lesser, preferably lesser, amounts of one or more olefinically-unsaturated carboxylic acids. Other monomeric materials are not essentially present in the monomeric mixture but, as explained hereinbelow, may be present, if desired.

Any of the alkyl esters of acrylic acid are utilizable in the production of the carboxyl-containing interpolymers according to the preferred method of this invention. Illustrative alkyl acrylates which may be utilized include methyl acrylate, ethyl acrylate, n-propyl acrylate, isopropyl acrylate, n-butyl acrylate, isobutyl acrylate, n-amyl acrylate, n-hexyl acrylate, isoheptyl acrylate, n-octyl acrylate, isooctyl acrylates such as 6-methylheptyl acrylate, capryl acrylate (1-methylheptyl acrylate), n-nonyl acrylate, isononyl acrylates such as 3,5,5-trimethylhexyl acrylate, n-decyl acrylate, lauryl acrylate and others.

Better results are obtained by the use of monomeric mixtures comprising an alkyl acrylate containing from 1 to 4 carbon atoms in the alkyl group. The latter acrylates produce harder and stronger polymers than the higher alkyl acrylates. It is also within the contemplation of this invention to utilize mixtures of alkyl acrylates containing 50% or more of a lower alkyl acrylate containing from 1 to 4 carbon atoms in the alkyl group and equal or lesser proportions of an alkyl acrylate containing from 5 to 12 carbon atoms in the alkyl group. Ethyl acrylate because of its ability to produce polymers which are both strong and plastic is the preferred alkyl acrylate.

The olefinically-unsaturated carboxylic acids which are polymerized with the acrylic esters in Step A of the process are characterized by possessing one or more olefinic carbon-to-carbon double bonds and one or more carboxyl groups and are interpolymerizable with the acrylic esters. Thus the acids which may be utilized include monocarboxy and polycarboxy, monoolefinic and polyolefinic acids including, for example, such widely divergent materials as acrylic acid, the alpha-alkyl acrylic acids, crotonic acid, beta-acryloxy propionic acid, acryloxy polyhydracryloxy propionic acid having the structure $CH_2=CHCOO(CH_2CH_2COO)_nH$, where $n$ is 3 or 4, alpha- and beta-vinyl acrylic acid, alpha-beta isopropylidene propionic acid, sorbic acid, cinnamic acid, maleic acid, oleic acid, undecylenic acid, ricinoleic acid, linoleic acid, linolenic acid and others.

Best results are obtained by the utilization of one or more olefinically-unsaturated carboxylic acids containing at least one activated olefinic carbon-to-carbon double bond, that is, an acid containing an olefinic double bond which readily functions in an addition polymerization reaction because of the olefinic double bond being present in the monomer molecule either in the alpha-beta position with respect to a carboxyl group thusly

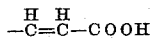

or attached to a terminal methylene grouping thusly $CH_2=C<$. In the alpha-beta unsaturated carboxylic acids the close proximity of the strongly polar carboxyl group to the double-bonded carbon atoms has a strong activating influence rendering the substances containing this structure very readily polymerizable. Likewise, when an olefinic double bond is present attached to a terminal methylene group, the methylenic hydrogen atoms are very reactive making the double bonded carbon atoms readily enter into polymerization reactions.

Illustrative alpha-beta unsaturated carboxylic acids within the above-described preferred class include maleic acid, fumaric acid, crotonic acid, alpha-butyl crotonic acid, angelic acid, hydrosorbic acid, cinnamic acid, m-chloro cinnamic acid, p-chloro cinnamic acid, umbellic acid, beta-benzal acrylic acid, beta-methyl acrylic acid (isocrotonic acid or 2-butenoic acid), and other monoolefinic monocarboxylic acids; sorbic acid, alpha-methyl sorbic acid, alpha-ethyl sorbic acid, alpha-chloro sorbic acid, alpha-bromo sorbic acid, beta-chloro sorbic acid, alpha-, beta-, or gamma-, epsilon dimethyl sorbic acid, alpha-methyl-gamma-benzal crotonic acid, beta-(2-butenyl) acrylic acid (2,4-heptadiene-oic-1), 2,4-pentadienoic acid, 2,4,6-octatrienoic acid, 2,4,6,8-decatetrienoic acid, 1-carboxy-1-ethyl-4-phenyl butadiene-1,3,2,6-dimethyl decatriene-(2,6,8)-oic-10, alpha-beta-isopropylidene propionic acid having the structure

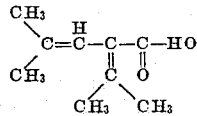

alpha-vinyl cinnamic acid, alpha-isopropenyl-furfural acetic acid, alpha-isopropenyl-cinnamenyl acrylic acid, and other polyolefinic monocarboxylic acids; hydromuconic acid, glutaconic acid, and other monoolefinic polycarboxylic acids; 3-carboxy-pentadiene-(2,4)-oic-1, muconic acid, and other polyolefinic polycarboxylic acids.

Olefinically-unsaturated carboxylic acids containing the $CH_2=C<$ structure include acrylic acid, alpha-chloro acrylic acid, methacrylic acid, ethacrylic acid, alpha-iso- propylidene acrylic acid, alpha-styryl acrylic acid (2-carboxy-4-phenyl butadiene-1,3), beta-vinyl acrylic acid (1-carboxy-butadiene-1,3), alpha-vinyl acrylic acid, beta-acryloxy propionic acid, beta-acryloxy acetic acid, and others.

Most desirable polymers are obtained in Step A by interpolymerizing with an alkyl acrylate a monoolefinic monocarboxylic acid having its olefinic double bond in alpha-beta position to the carboxyl group and present in a terminal methylene grouping, such as the acrylic and alpha-substituted acrylic acids including acrylic acid, methacrylic acid, ethacrylic acid, alpha-chloro acrylic acid and the like.

The proportion of the two essential monomeric ingredients in the monomeric mixture may be varied considerably according to the characteristics desired in the final polymer. It has been discovered that replacement of acrylic ester in the polymer by as little as 1.0% or less of interpolymerized acid produces a polymer which when elasto-condensed with a polyvalent metal oxide produces a polymeric metallo-carboxylate possessed of a tensile strength from 200 to 1,000 lbs./sq. in. higher than a similarly cured polyester composition. As the amount of olefinically-unsaturated acid in the monomeric mixture (and consequently in the polymer) is increased the tensile strength of the polymeric metallo-carboxylate obtained therefrom is increased but the ease of working of the unelasticized polymer is decreased. It is preferred, therefore, for obtaining plastic easily-worked rubbery materials, to employ monomer mixtures containing in the range of 1 to 30% by weight of the acid component. When only the alkyl acrylate and the acid are interpolymerized this means, of course, that the proportion of the former will be in the range of 70 to 99% by weight.

The proportions of monomeric materials in the total monomeric mixture will vary also depending on the acid used for some unsaturated acids enter the polymer chain with greater ease than others. For example, acrylic acid, methacrylic acid and ethacrylic acid polymerize very readily with the alkyl acrylates while others such as sorbic acid, oleic acid, linolenic acid, and others are more difficultly polymerizable so that the proportion of combined acid in the polymer is usually less than its proportion in the monomeric mixture. For these reasons, relatively larger amounts of the slower polymerizing acids have to be charged during polymerization.

A more precise manner of defining the polymers for use in Step B of this invention is in terms of their combined acid content, the latter being defined herein in terms of chemical equivalents by weight of carboxyl (—COOH) per 100 parts by weight of polymer and will sometimes be referred to by the designation ephr. ("equivalents per hundred of rubber"). The latter value is easily determined, for example, by titration of a polymer solution with alcoholic KOH to a phenolphthalein end-point. The polymers containing from 0.01 to 0.30 chemical equivalent by weight of (—COOH) per 100 parts of rubber are predominantly plastic in nature and are adapted to produce strongly elastic compositions when condensed with a polyvalent metal oxide. Polymers containing from 0.02 to 0.20 ephr. of carboxyl are preferred for the production of elastic polymeric metallocarboxylates having the best balance of properties while those containing 0.02 to 0.15 ephr. of carboxyl are preferred for the production of strong elastic compositions having the best low temperature flexibility.

In addition to the two essential types of monomers (that is, the alkyl acrylate and the olefinically-unsaturated acid), the monomer mixture polymerized may also contain one or more interpolymerizable monoolefinic materials. Illustrative monoolefinic monomers which may be so interpolymerized include acrylontrile, alpha-chloro acrylonitrile, chloroethyl vinyl ether, N,N'-dimethyl acrylamide, styrene, vinylidene chloride, vinyl benzoate, vinyl pyridine, vinyl acetate, vinyl propionate, isobutylene and others. In addition, very small amounts (0.1 to 5.0% by weight) of divinyl compounds such as p-divinyl benzene, diallyl maleate and others may be utilized. Such additional monomers may be considered to be replacements-in-part for either the alkyl acrylate or the olefinically-unsaturated carboxylic acids. Thus multi-component interpolymers having excellent properties when condensed with a polyvalent metallic oxide are produced from monomeric mixtures containing from 50 to 94% by weight of an alkyl acrylate preferably one containing from 1 to 4 carbon atoms in the alkyl group, from 1 to 45%, more preferably 2 to 30%, by weight of the unsaturated acid and from 5 to 40% by weight of one or more than one of the additional monomeric materials.

In preparing the polymers in Step A, monomeric mixtures, as above disclosed, are polymerized in an acidic medium (that is, in a medium with a pH below 7) in the presence of a suitable polymerization catalyst. The use of an acidic medium insures the production of a true addition-type polymer containing interpolymerized free carboxyl (—COOH) groups and having a molecular weight sufficiently high to be possessed of excellent properties. The polymerization may be of the homogeneous type or carried out in solution or preferably in an acidic aqueous medium. The preferred acidic aqueous medium may either be emulsifier-free or it may contain an emulsifier adapted for use under acidic conditions. Suitable emulsifiers include hymolal sulfates and sulfonates such as sodium lauryl sulfate, the sodium salts of sulfonated petroleum or paraffin oils, the sodium salts of dodecane-1-sulfonic acid, octadecane-1-sulfonic acid, etc.; aralkyl sulfonates such as sodium isopropyl benzene sulfonate and sodium isobutyl naphthalene sulfonate; alkali metal salts of sulfonated dicarboxylic acid esters and amides such as sodium dioctyl sulfosuccinate, sodium-N-octadecyl-sulfosuccinamate and the like, and others. Much preferred, however, are the so-called cationic emulsifiers such as the salts of strong inorganic acids and organic bases containing long carbon chains, for example, lauryl amine hydrochloride, the hydrochloride of diethylaminoethyloleylamide, trimethyl cetyl ammonium bromide, dodecyl trimethyl ammonium bromide, the diethylcyclohexylamine salt of cetyl sulfuric ester, and others. In addition to the above and other polar or ionic emulsifiers, stable at a pH below 7, still other materials which may be used, singly or in combination with one or more of the above-mentioned types of emulsifiers, include the so-called "non-ionic" emulsifiers (some of which are particularly adapted for use in acidic media) such as the polyether alcohols prepared by condensing ethylene oxide with higher alcohols, the fatty alkylol-amine condensates, the diglycol esters of lauric, oleic, and stearic acids, and others.

The catalyst, required for satisfactory polymerization rate, may be any of those commonly employed for the polymerization of monoolefinic or acrylic-type compounds including actinic light and the various peroxygen compounds such as hydrogen peroxide, benzoyl peroxide, pelargonyl peroxide, cumene hydroperoxide, tertiary butyl hydroperoxide, 1-hydroxycyclohexyl hydroperoxide, tertiary butyl diperphthalate, tertiary butyl perbenzoate, sodium, potassium and ammonium persulfate and others. The polymerization in acidic medium in the presence of these catalysts may be performed under full pressure or may be conducted under reflux as is well understood in the art.

While the polymerization may be carried out in the presence of air, the rate of reaction is ordinarily faster in the absence of oxygen and hence polymerization in a vessel which has been evacuated or under an inert atmosphere such as nitrogen is preferred. The temperature at which the polymerization is carried out is not critical; it may be varied widely from −30° C. to 125° C. or higher, though best results are generally obtained at a temperature of about 0° C. to about 100° C., more preferably from 20 to 80° C.

In order to minimize variation in the rate of reaction and to maintain a given proportion of each of the two essential monomers in the reaction mixture throughout the reaction (and thereby improve also the homogeneity of the product and insure incorporation of a desired amount of free (—COOH) groups in the polymer molecules) it is sometimes desirable to introduce the acid (or acid and monoolefinic monomer) gradually during the course of the reaction. By the latter method, which is well understood by the art, it is possible to obtain efficient interpolymerization of the acrylic ester and the olefinically-unsaturated acid.

Other polymerization techniques and practices conventionally employed in the preparation of alkyl acrylate polymers may also be used in polymerizing the monomeric mixtures herein described. For example, proportional addition of catalyst is advantageously employed to control reaction rate. In addition, the use of mercaptan modifiers in the reaction mixture is often desirable and results in a polymer of increased plasticity. Still other substances which desirably may be incorporated in the reaction medium include acidic buffers and other electrolyte salts (in an aqueous medium), carbon black and other filler materials, plasticizers, stabilizers and others.

The polymers of this invention are obtained from a homogeneous polymerization as a solid plastic mass, from a solution polymerization as a polymer solution from which the solid polymer is obtained by precipitation, from an emulsifier-free aqueous medium as a flocculent polymer or a crude but filterable polymeric dispersion, and from an aqueous emulsion system as a true polymer latex which must be coagulated to obtain the solid polymer. Coagulation of the acidic latices obtained from the preferred aqueous emulsion method is preferably effected so as not to impair or destroy the free carboxyl groups of the polymer. This may be accomplished by admixing the latex with a dilute (Ca 3-15%) hydrochloric, sulfuric or acetic acid solution, or an acidified alcohol solution such as ethyl alcohol, or a combination of salt (NaCl) and alcohol, or by a dilute (Ca 1 to 30%) acidic aqueous solution of a polyvalent metal salt of a strong acid such as calcium chloride, calcium nitrate, zinc chloride, alum and others. Calcium chloride solution (Ca 1 to 30%) slightly acidified with HCl will efficiently coagulate the acidic latices whether the latex is added to the coagulant or vice versa.

Step B in the process of this invention is performed by admixing the plastic carboxyl-containing, acrylic ester interpolymer with a polyvalent metal oxide in any conventional manner such as by mill-mixing, in a Banbury-type or other internal mixer, by mixing an aqueous dispersion of the polyvalent metal oxide with a latex of the polymer and coprecipitating the mixed dispersion, and the like. The intermixture of the solid polymer with the metal oxide should be performed at moderate working temperatures, that is below mill roll temperatures of about 275° F. and preferably below 200° F., in order to avoid "scorching" of the stock. The mastication of the mixture should be continued until the resulting mixture is homogeneous with the metal oxide well dispersed in the polymer. Softeners, plasticizers, milling acids etc., may be utilized to facilitate the mixing step. In any case, the resulting intermixture should be plastic, workable, and homogeneous.

The polyvalent metallic oxides which may be utilized in Step B are those of zinc (preferred), magnesium, cadmium, calcium, titanium, aluminum, barium, strontium, copper(ic), cobalt(ic), tin and others. Specifically, zinc oxide, calcium oxide, cadmium oxide (CdO), magnesium oxide (MgO), dibutyl tin oxide, lead oxide (PbO), barium oxide (BaO), cobalt oxide ($CO_2O_3$), tin oxide (SnO), strontium oxide (SrO), and others produce superior results and are preferred. In addition, various polyvalent metallic hydroxides, which in reality are hydrated polyvalent metallic oxides and upon heating or upon reaction with polymer carboxyl (—COOH) groups readily split off water, such as calcium hydroxide, cadmium hydroxide [Cd(OH)$_2$], zinc hydroxide, barium hydroxide, and others also are utilizable to produce excellent, strongly elastic polymeric metallo-carboxylates.

The proportions of polyvalent metal oxide required for efficient cure will vary, of course, depending on the curing agent itself, on the interpolymerized acid content (or —COOH content) of the polymer and on the fineness and compatibility of the metal oxide with the polymer. Amounts of metal oxide chemically equivalent to at least ½ the carboxyl content of the polymer should be utilized in order to produce strongly elastic polymeric metallo-carboxylates. For optimum results, the amount of curing agent should be at least equivalent chemically to the (—COOH) content of the polymer. Substantially chemical equivalent amounts of a metal oxide such as zinc, calcium or cadmium oxide, for example, produce nearly transparent pure gum compositions while excess metal oxide produces opaque cured compositions. Since excess curing agent does not have an adverse effect on the elastic properties it is generally preferred, when transparency is not desired, to utilize amounts of curing agent in excess of stoichiometrical proportions and preferably twice or more stoichiometrical amounts. Generally, however, amounts of a curing agent such as zinc oxide varying from 1 to 30% based on the weight of polymer will be found sufficient with amounts from 4 to 20% being preferred.

The polymeric condensation or "elasto-condensation" occurring in Step C of the process of this invention is a reaction which occurs with greater ease than, for example, the reaction involved in sulfur vulcanization of unsaturated polymeric materials. It will occur to a certain extent upon long standing at room temperature but, however, since most manufacturing processes require shorter curing cycles, it is generally desirable to heat the plastic, metal oxide containing polymer composition to cause the polymer to flow and coalesce and to insure efficient distribution or solubilization of the oxide through the composition. For the latter reasons, it is generally preferred to heat the plastic composition at temperatures varying from 125 to 400° F., more preferably 150 to 350° F. Below 125° F. the condensation reaction is slow and above 400° F. excessive blowing and pitting of the composition occurs. The condensation reaction will generally be complete in from 5 to 10 minutes to as long as 2 hours at temperatures of 125 to 400° F. Further heating at these temperatures, while it does not result in breakdown of the polymeric metallo-carboxylate, does not produce a significant improvement in physical properties and accordingly is not preferred. Since one of the products of the salt-formation reaction is water, the cure of thick cross sections is preferably effected in a mold under a pressure and at a temperature at which water will not be vaporized. By such a method it is possible to prevent blowing and pitting in the interior of the cross section. For the latter reason, it is preferable to effect the cure of thick cross sections in a mold at temperatures of from 150 to 300° F. under pressures from 1,000 to 30,000 lbs./sq. in. or more.

The invention will be more fully described with reference to the following specific examples demonstrating the preparation of various polymeric metallo-carboxylates. The examples are intended to be illustrative only and not as limitations on the scope of the invention.

EXAMPLE 1

A tripolymer is made by first preparing a soap solution containing 10.88 gms. of dodecylamine hydrochloride (100% neutralized with HCl) in 1566 gms. of water. To this soap solution in a reaction vessel fitted with a reflux condenser there is added a mixture of monomers consisting of 374 gms. of ethyl acrylate, 11.15 gms. of acrylic acid, and 14.84 grams of methacrylic acid, the vessel sealed and evacuated, and its contents heated to 80° C. A catalyst solution consisting of 0.428 gm. of potassium persulfate in 200 cc. of water is prepared and added at a rate of 3.0 milligrams of potassium persulfate per hour. In three hours a total of 10 cc. of catalyst solution is added, the temperature of the reaction increasing from 80° C. to 95° C. at the end of 3 hours. Reaction proceeds smoothly with the obtainment of 80% conversion in 3.5 hours. Samples of the aqueous dispersion withdrawn at 1.5 hours contain a polymer analyzing 4.2% carboxyl (—COOH), at 2.5 hours 3.95% carboxyl, and at the end of the reaction at 3.5 hours 4.0% carboxyl. Coagulation of the acidic aqueous polymer dispersion with alcohol, washing the polymer several times with several volumes each of 3% HCl solution and several times with clear water until the coagulum is acid-free, and followed by drying at 55° C. in an air oven produces a plastic interpolymer containing 0.089 ephr. of (—COOH).

The tripolymer of this example is mixed on a two-roll plastic mill with 5 phr. (0.125 ephr.) of zinc oxide and a homogeneous plastic composition is formed. The plastic composition is heated under pressure in a press mold for 40 minutes at 270° F. to form a strong, elastic composition having a tensile strength of 2250 lbs./sq. in., an elongation of 455%, and a modulus at 300% elongation of 1570 lbs./sq. in. When the tripolymer is mixed with 10 phr. (0.250 ephr.) of zinc oxide and similarly press molded, a stronger elastic composition is obtained having a tensile strength of 2770 lbs./sq. in., an elongation of 380%, and a 300% modulus of 2020 lbs./sq. in. By comparison, a polyethylacrylate produced by polymerization in alkaline aqueous emulsion when cured with 20 phr. of litharge has a tensile strength of only 800 lbs./sq. in. and when cured with as much as 18 phr. of sodium meta-silicate exhibits a tensile strength of only 1200 lbs./sq. in.

EXAMPLE 2

A tripolymer prepared by polymerization of a mixture of 95.6% by weight of ethyl acrylate, 2.2% by weight of acrylic acid, and 2.2% methacrylic acid by polymerization in a medium similar to that of Example 1 is found to contain .047 ephr. of (—COOH). When admixed with 4.3 phr. of zinc oxide and 2.0 phr. of anthranillic acid and press molded for 40 minutes at 270° F. a strong "snappy" elastic composition is obtained having a tensile strength of 2120 lbs./sq. in., 700% elongation, and a 300% modulus of 500 lbs./sq. in.

EXAMPLE 3

A copolymer of ethyl acrylate and methacrylic acid is prepared by the polymerization of the monomeric materials in a reaction mixture of the following proportions:

| Material: | Weight—Grams |
| --- | --- |
| Ethyl acrylate | 462.5 |
| Methacrylic acid | 37.4 |
| Buffer: | |
| Citric acid | 0.95 |
| Na$_2$HPO$_4$·7H$_2$O | 13.40 |
| Gelatin | 10.00 |
| Caprylyl peroxide | 0.50 |
| Water | 1500.00 |

The polymerization is conducted under full reflux starting at 80° C. and finishing at 95.5° C. at the end of 3 hours. The caprylyl peroxide catalyst is added gradually during the first 45 minutes of reaction. At the end of 3 hours the reaction is 97% complete with the production of a fine granular polymer. The solid copolymer is mixed with 7 phr. of zinc oxide and portions of the resulting plastic mixture press molded under varying conditions. Table I below contains the data obtained:

Table I

| Conditions | Tensile Strength, lbs./sq. in. | Elongation, Percent | 300% Modulus |
|---|---|---|---|
| 20 minutes at 220° F | 3,140 | 445 | 2,050 |
| 20 minutes at 240° F | 2,740 | 395 | 2,000 |
| 20 minutes at 260° F | 3,150 | 460 | 1,860 |
| 60 minutes at 260° F | 3,190 | 460 | 1,900 |
| 20 minutes at 280° F | 2,860 | 395 | 1,910 |
| 60 minutes at 280° F | 2,830 | 435 | 2,120 |

It is readily apparent that the composition of Example 3 exhibits "flat" curing characteristics permitting considerable variation in the time and temperature of cure.

EXAMPLE 4

In a similar fashion a copolymer of ethyl acrylate and methacrylic acid is prepared by polymerization in aqueous medium having the following proportions:

Material: Weight—grams
- Ethyl acrylate _____ 370.0
- Methacrylic acid _____ 30.0
- Gelatin _____ 4.0
- Caprylyl peroxide _____ 9.0
- Water _____ 1200.0

The reaction is run at 50° C. in a closed vessel. Reaction is 97.5% complete in 17 hours with the production of a fine granular polymer. Separate portions of the granular polymer are mixed with (1) 10 phr. of hydrated lime [Ca(OH)$_2$] and (2) 5 phr. of magnesium oxide and each is then molded 40 minutes at 270° F. Composition (1) exhibits a tensile strength of 2610 lbs./sq. in., an elongation of 380%, and 300% modulus of 2040 lbs./sq. in. Composition (2) exhibits a tensile strength of 2740 lbs./sq. in., an elongation of 340% and a modulus of 2420 lbs./sq. in. The magnesium composition is transparent while the hydrated lime composition is translucent in appearance. Similar results are obtained with calcium oxide, cadmium oxide, cadmium hydroxide, aluminum oxide, aluminum hydroxide, zinc hydroxide, dibutyl tin oxide, and the oxides of barium, strontium, copper, cobalt, tin and lead.

EXAMPLE 5

A copolymer of ethyl acrylate and beta-acryloxy propionic acid is prepared in an aqueous medium having the following proportions:

Material: Weight—grams
- Ethyl acrylate _____ 44.0
- Acryloxy propionic acid _____ 6.0
- Gelatin _____ 3.0
- Caprylyl peroxide _____ 3.0
- Water _____ 300.0

The reaction is run in a nitrogen atmosphere with incremental addition of 0.5 gram of caprylyl peroxide after 6.5 hours, 23, 34, and 54 hours reaction. The reaction is 78% complete in 72 hrs. at a temperature of 50° C. The polymer obtained is found to contain 2.06% carboxyl or 0.046 ephr. When the polymer is mixed with 5 phr. of zinc oxide and cured for 40 minutes at 260° F. a strong elastic composition is obtained.

EXAMPLE 6

In a manner similar to that of Example 5 a polymeric acid which may be termed an acryloxy polyhydracryloxy propionic acid having the structure $$CH_2=CHCOO(CH_2CH_2COO)_nH$$

wherein $n$ is 3 or 4, is copolymerized with methyl and ethyl acrylate. A copolymer made from a monomeric mixture containing 85% by weight of ethyl acrylate and 15% by weight of the acid, when mixed with 5 phr. of zinc oxide and heated for 40 minutes at 260° F., produces a clear, transparent and strongly elastic composition.

Similar results may be obtained by substitution of methyl acrylate, butyl acrylate, 2-ethylhexyl acrylate, n-octyl acrylate and other alkyl acrylates in whole or in part for the ethyl acrylate used in the foregoing examples. The polymeric metallo-carboxylates produced from such mixtures vary considerably in hardness or softness depending on the alkyl acrylate ester utilized but all are converted to a strong elastic condition by the polyvalent metal oxides.

EXAMPLE 7

Polymerization of monomeric mixtures containing from 60 to 80% of ethyl acrylate and from 20 to 40% methacrylic acid results in polymers containing from 0.15 to 0.30 ephr. of carboxyl. Cure of these polymers with zinc, calcium and magnesium oxides produces clear, transparent molded articles having unusual strength and rigidity. Monomeric mixtures containing up to 50% of acrylic acid likewise produce hard rigid molded articles when cured with a polyvalent metallic oxide such as those of calcium, magnesium, cadmium and zinc. Substitution for the acids in the previous examples of sorbic acid, maleic acid, cinnamic acid, oleic acid, linoleic acid, linolenic acid and other copolymerizable acids produce plastic acrylic polymers containing combined carboxyl groups and which are readily elasticized by a polyvalent metal oxide such as zinc oxide.

EXAMPLE 8

The following mixtures of monomeric materials, in which parts are by weight, are prepared:

Monomer mixture A:
- Ethyl acrylate _____ 90.0
- 2-chloroethyl vinyl ether _____ 5.0
- Acrylic acid _____ 2.5
- Methacrylic acid _____ 2.5

Monomer mixture B:
- Ethyl acrylate _____ 88.0
- 2-chloroethyl acrylate _____ 5.0
- p-divinyl benzene _____ 2.0
- Acrylic acid _____ 5.0

Each mixture is polymerized in an aqueous phase having the following composition:

Aqueous phase:
- Water _____ 133.0
- Emulsifier [1] _____ 3.0
- Potassium persulfate _____ 1.0
- Sodium pyrophosphate _____ 0.7

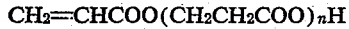
[1] A sodium lauryl sulfate known as "Santomerse S."

In each polymerization the water, emulsifier, catalyst and buffer are charged to a reaction vessel, the vessel sealed and flushed out with nitrogen and the resulting aqueous phase heated to 60° C. The monomers are then premixed and the mixture proportioned into the reaction vessel at a uniform rate for 8 hours. The reaction in both cases proceeds smoothly with the obtainment in 10 hours of a substantially quantitative yield of polymer in the form of an excellent latex. Both latices are coagulated with acidified hot (90° C.) calcium chloride solution. The coagulum recovered in each case is washed several times with several volumes of 3% hydrochloric acid solution, then several times with clear water until the wash water is substantially free of chloride ion, and finally dried at 55° C. in an air oven.

The dried coagulum obtained from monomer Mixture A and that derived from Mixture B are observed to possess superior raw polymer strength (that is, they are tougher), yet when milled on a cold plastic roll mill they are observed to form into a cohesive sheet with but one or two passes through the mill. Ordinary polyacrylates and copolymers of ethylacrylate with 2-chloroethyl vinyl ether or 2-chloroethylacrylate, on the other hand, suffer considerable plastic flow during storage at normal temperatures and are "nervy" during milling and have a strong tendency to stick to the rolls.

Separate portions of each of the tetrapolymers of this example are mixed with compounding materials according to the following recipes, in which parts are by weight:

| Material | Recipe A | Recipe B |
| --- | --- | --- |
| Tetrapolymer | 400.0 | 400.0 |
| Sulfur | 8.0 | |
| Carbon black [1] | 200.0 | 200.0 |
| Stearic Acid | 4.0 | 4.0 |
| Accelerator [2] | 8.0 | |
| Zinc Oxide | 10.0 | 20.0 |

[1] A carbon black known as "Philblack A".
[2] An aldehyde-amine condensate known as "Trimene Base" and characterized as triethyltrimethylene triamine.

The resulting plastic compositions are placed in a press mold between cellophane sheets, preheated to 100° C., and then cured at 298° F. for 30 minutes. The result in each case is a strong elastic product having from 2000 to in excess of 3000 lbs./sq. in. tensile strength and having excellent flex life, resistance to oxidation (especially to ozone), resistance to oils and greases, and resistance to sunlight. Thus the tetrapolymers of this example are seen to be curable with both a sulfur-amine-metal oxide combination or with a polyvalent metal oxide alone.

While I have disclosed certain manners of performing my invention, I do not thereby desire or intend to limit myself solely thereto, for the precise proportions of the materials utilized may be varied and equivalent materials may be employed, if desired, without departing from the spirit and scope of the invention as defined in the appended claims.

I claim:
1. The method which comprises preparing a mixture of (1) an essentially saturated plastic polymer prepared by polymerizing in an acidic aqueous medium a monomeric mixture comprising an alkyl ester of acrylic acid containing from 1 to 12 carbon atoms in the alkyl group and an olefinically-unsaturated carboxylic acid, said polymerization being conducted with such proportions of said monomeric materials as to obtain a plastic interpolymer containing from 0.01 to 0.30 chemical equivalents by weight of combined —COOH per 100 parts by weight of interpolymer, and (2) an amount of a polyvalent metal oxide at least equivalent chemically to one-half said combined —COOH, and heating the resulting plastic composition at a temperature of from 125 to 400° F. until said plastic composition is converted to an essentially elastic condition.

2. The method which comprises preparing a mixture of (1) an essentially saturated plastic polymer prepared by polymerizing in an acidic aqueous emulsion a monomeric mixture comprising a major proportion of an alkyl ester of acrylic acid containing from 1 to 4 carbon atoms in the alkyl group and a minor proportion of an olefinically-unsaturated carboxylic acid containing the structure $CH_2=C<$, said polymerization being conducted with proportions of said monomeric materials as to obtain from 0.01 to 0.30 chemical equivalents by weight of combined —COOH per 100 parts by weight of plastic polymer, and (2) an amount of a polyvalent metal oxide at least equivalent chemically to said combined —COOH, and heating the resulting plastic composition at a temperature of from 150 to 350° F. until said plastic composition is converted to an essentially elastic condition.

3. The method which comprises preparing a mixture of (1) an essentially saturated plastic polymer prepared by polymerizing in an acidic aqueous medium a monomeric material comprising a major proportion of an alkyl acrylate containing from 1 to 4 carbon atoms in the alkyl group and a minor proportion of an olefinically-unsaturated carboxylic acid containing at least one activated olefinic carbon-to-carbon double bond, said polymerization being conducted with proportions of said monomeric materials as to yield a plastic polymer containing from 0.01 to 0.30 chemical equivalents by weight of combined —COOH per 100 parts by weight of polymer, and (2) an amount of a polyvalent metal oxide at least equivalent chemically to said combined —COOH, and heating the resulting plastic composition at a temperature of from 150 to 350° F. until the plastic composition has been converted to an essentially elastic condition.

4. The method which comprises preparing a mixture of (1) an essentially saturated plastic polymer prepared by polymerizing in an acidic aqueous emulsion a monomeric mixture comprising a major proportion of an alkyl acrylate containing from 1 to 4 carbon atoms in the alkyl group and a minor proportion of an alpha-beta unsaturated carboxylic acid, said polymerization being conducted with proportions of said monomeric materials to yield a plastic interpolymer containing from 0.02 to 0.20 chemical equivalents by weight of combined —COOH per 100 parts by weight of interpolymer, and (2) an amount of a polyvalent metal oxide at least equivalent chemically to twice said combined —COOH, and heating the resulting plastic composition at a temperature of from 150 to 350° F. until the plastic composition has been converted to an essentially elastic condition.

5. The method which comprises preparing a mixture of (1) an essentially saturated plastic polymer prepared by polymerizing in an acidic aqueous emulsion a monomeric mixture comprising a major proportion of an alkyl acrylate containing from 1 to 4 carbon atoms in the alkyl group and a minor proportion of acrylic acid, said polymerization being conducted with proportions of said monomeric materials to yield a plastic interpolymer containing from 0.020 to 0.20 chemical equivalents by weight of combined —COOH per 100 parts by weight of interpolymer, and (2) an amount of a polyvalent metal oxide at least equivalent chemically to twice said combined —COOH, and heating the resulting plastic composition at a temperature of from 150 to 350° F. until the plastic composition has been converted to an essentially elastic condition.

6. The method which comprises preparing a mixture of (1) an essentially saturated plastic polymer prepared by polymerizing in an acidic aqueous emulsion a monomeric mixture comprising a major proportion of an alkyl acrylate containing from 1 to 4 carbon atoms in the alkyl group and a minor proportion of methacrylic acid, said polymerization being conducted with proportions of said monomeric materials to yield a plastic interpolymer containing from 0.02 to 0.20 chemical equivalents by weight of combined —COOH per 100 parts by weight of interpolymer, and (2) an amount of a polyvalent metal oxide at least equivalent chemically to twice said combined —COOH, and heating the resulting plastic composition at a temperature of from 150 to 350° F. until the plastic composition has been converted to an essentially elastic condition.

7. The method which comprises preparing a mixture of (1) an essentially saturated plastic polymer prepared by polymerizing in an acidic aqueous emulsion a monomeric mixture comprising a major proportion of an alkyl acrylate containing from 1 to 4 carbon atoms in the alkyl group and a minor proportion of beta-acryloxy propionic acid, said polymerization being conducted with proportions of said monomeric materials to yield a plastic interpolymer containing from 0.02 to 0.20 chemical equivalents by weight of combined —COOH per 100 parts by weight of interpolymer, and (2) an amount of a polyvalent metal oxide at least equivalent chemically to twice said combined —COOH, and heating the resulting plastic composition at a temperature of from 150 to 350° F. until the plastic composition has been converted to an essentially elastic condition.

8. The method which comprises preparing a mixture of (1) an essentially saturated plastic polymer prepared by polymerizing in an acidic aqueous emulsion a monomeric mixture comprising a major proportion of an alkyl acrylate containing from 1 to 4 carbon atoms in the alkyl group and a minor proportion of acryloxy polyhydracryloxy propionic acid having the structure

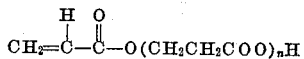

wherein $n$ is a number from 3 to 4, said polymerization being conducted with proportions of said monomeric materials to yield a plastic interpolymer containing from 0.02 to 0.20 chemical equivalents by weight of combined —COOH per 100 parts by weight of interpolymer, and (2) an amount of a polyvalent metal oxide at least equivalent chemically to twice said combined —COOH, and heating the resulting plastic composition at a temperature of from 150 to 350° F. until the plastic composition has been converted to an essentially elastic condition.

9. The method of claim 5 in which the alkyl acrylate is ethyl acrylate and the polyvalent metal oxide is zinc oxide.

10. The method of claim 6 in which the alkyl acrylate is ethyl acrylate and the polyvalent metal oxide is zinc oxide.

11. The method of claim 1 wherein the polyvalent metal oxide is selected from the class consisting of zinc oxide, calcium oxide, cadmium oxide, magnesium oxide, dibutyl tin oxide, lead oxide, barium oxide, cobalt oxide, tin oxide and strontium oxide.

12. The method of claim 2 wherein the polyvalent metal oxide is selected from the class consisting of zinc oxide, calcium oxide, cadmium oxide, magnesium oxide, dibutyl tin oxide, lead oxide, barium oxide, cobalt oxide, tin oxide and strontium oxide.

13. The method of claim 4 wherein the polyvalent metal oxide is selected from the class consisting of zinc oxide, calcium oxide, cadmium oxide, magnesium oxide, dibutyl tin oxide, lead oxide, barium oxide, cobalt oxide, tin oxide and strontium oxide.

14. The method of claim 5 wherein the polyvalent metal oxide is selected from the class consisting of zinc oxide, calcium oxide, cadmium oxide, magnesium oxide, dibutyl tin oxide, lead oxide, barium oxide, cobalt oxide, tin oxide and strontium oxide.

15. The method of claim 6 wherein the polyvalent metal oxide is selected from the class consisting of zinc oxide, calcium oxide, cadmium oxide, magnesium oxide, dibutyl tin oxide, lead oxide, barium oxide, cobalt oxide, tin oxide and strontium oxide.

References Cited in the file of this patent

UNITED STATES PATENTS

| | | |
|---|---|---|
| 1,984,417 | Mark et al. | Dec. 18, 1934 |
| 2,183,226 | Rein | Dec. 12, 1939 |
| 2,234,204 | Starkweather et al. | Mar. 11, 1941 |
| 2,395,506 | Sauser | Feb. 26, 1946 |
| 2,398,350 | Atwood et al. | Apr. 16, 1946 |
| 2,416,060 | McAlevy et al. | Feb. 18, 1947 |
| 2,462,354 | Brubaker et al. | Feb. 22, 1949 |